July 25, 1933.  J. SALSBURG  1,919,397
CORN PLANTER
Filed Jan. 11, 1933  4 Sheets-Sheet 1
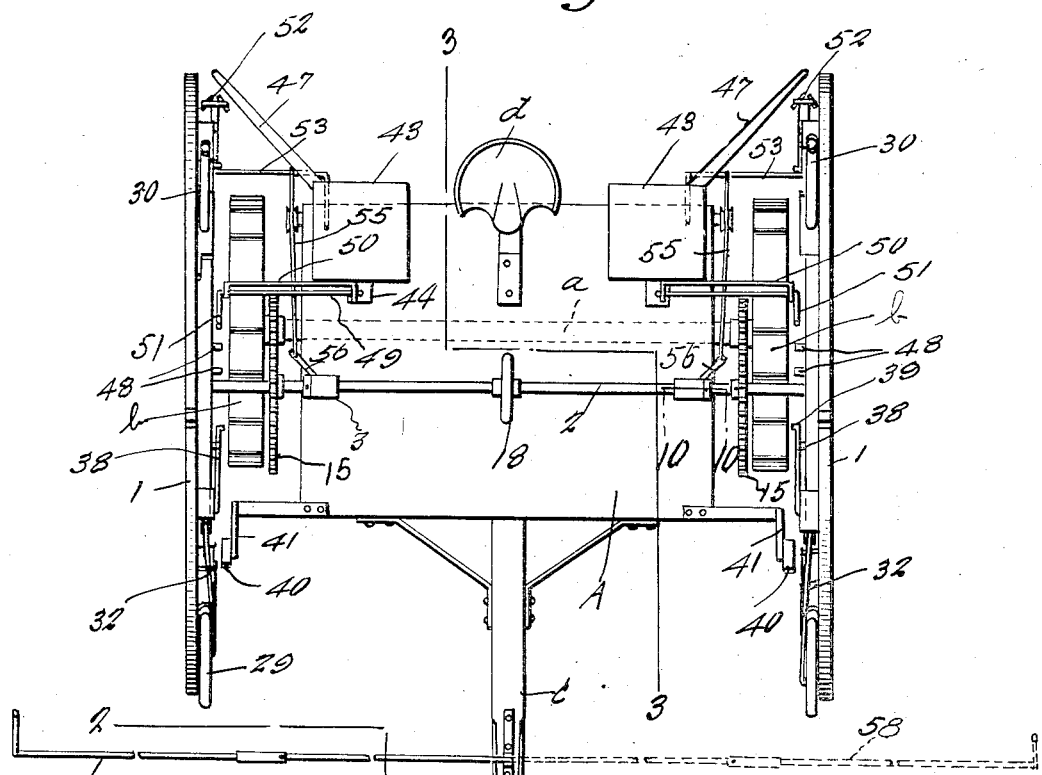
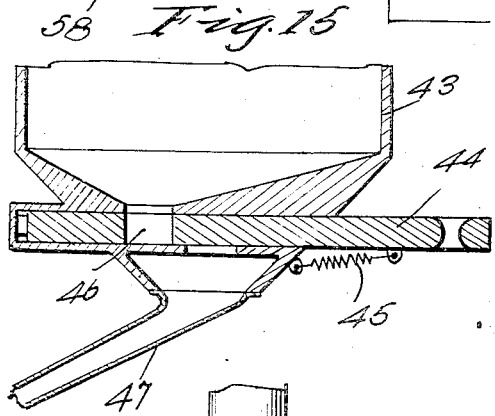
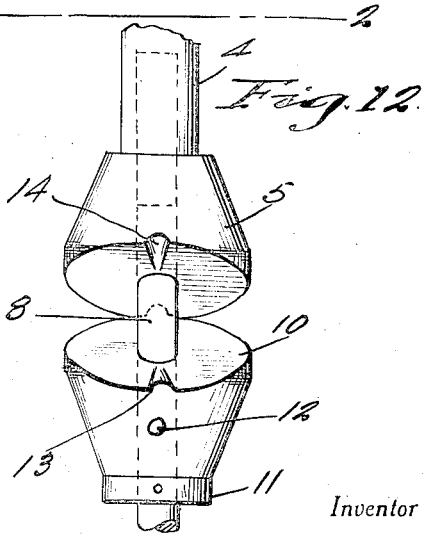
Inventor
Jacob Salsburg
By Clarence A. O'Brien
Attorney

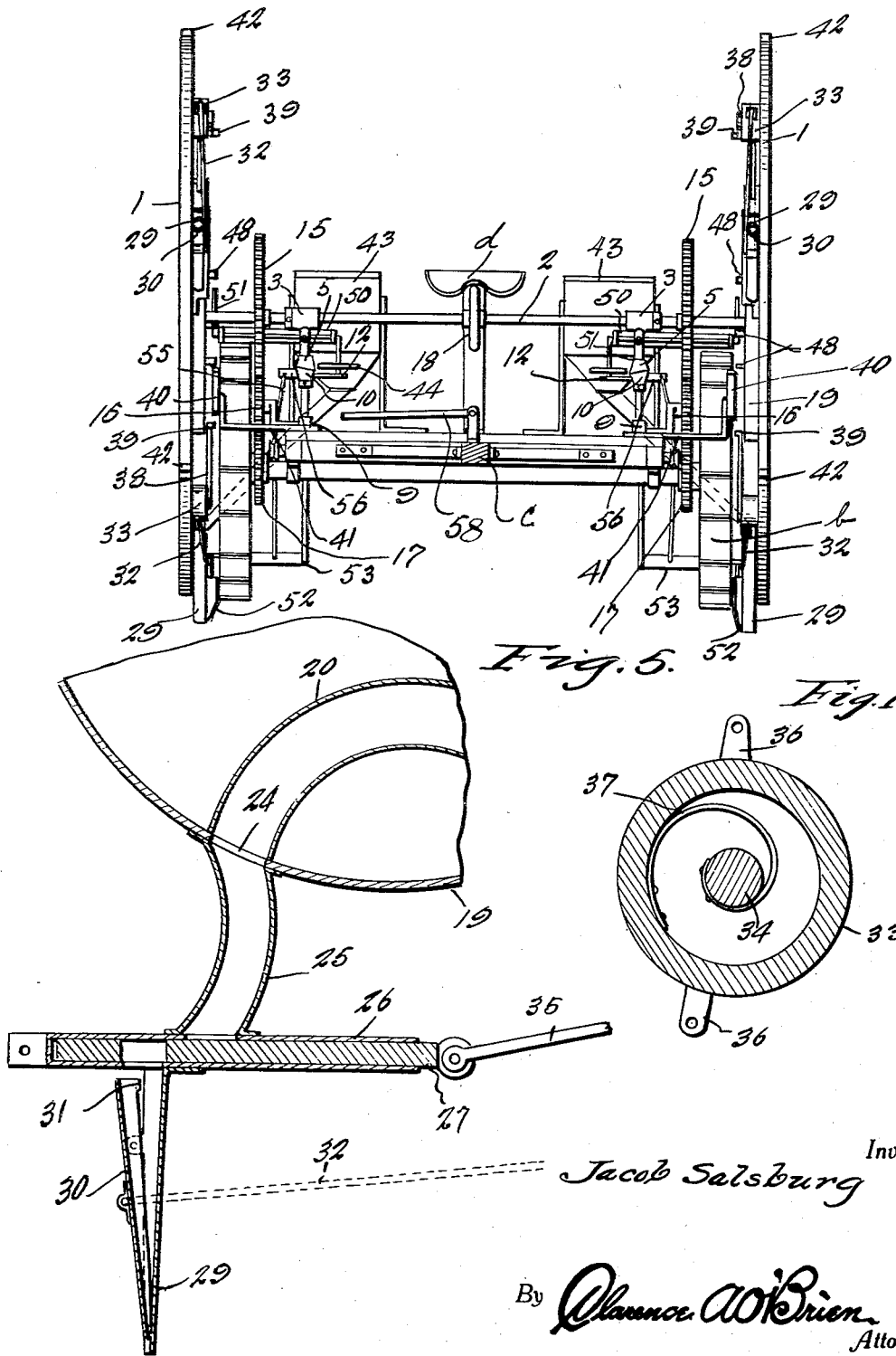

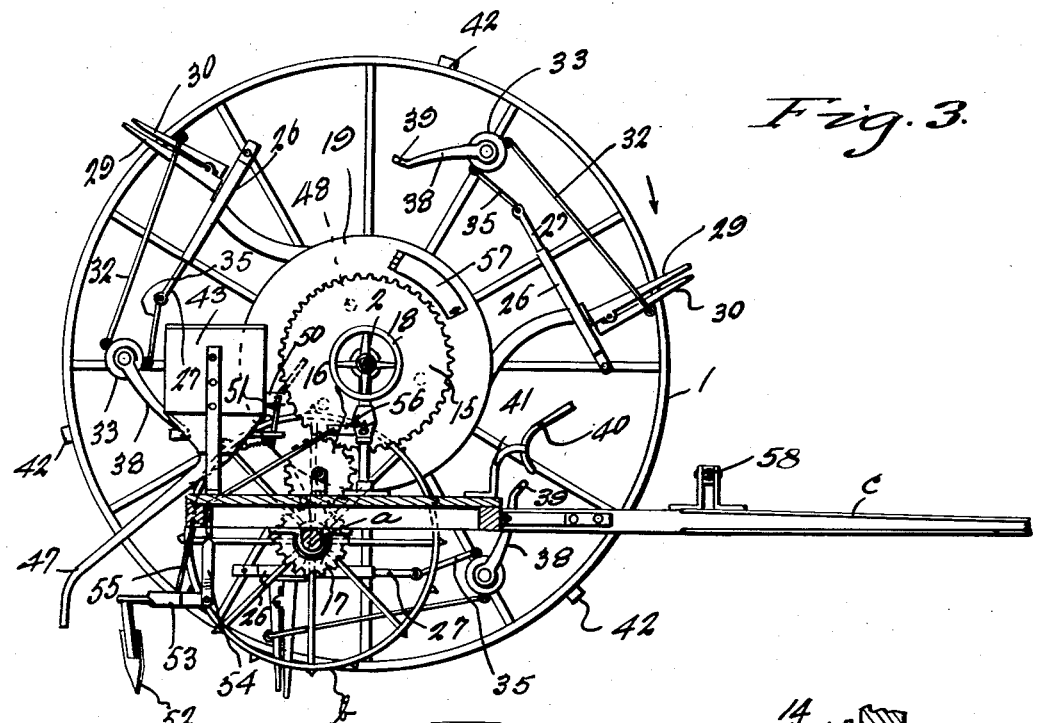
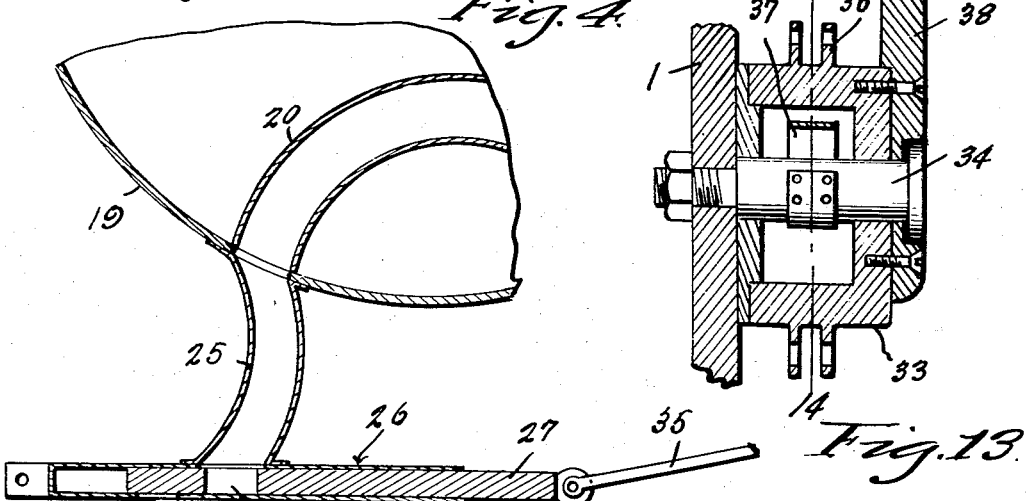
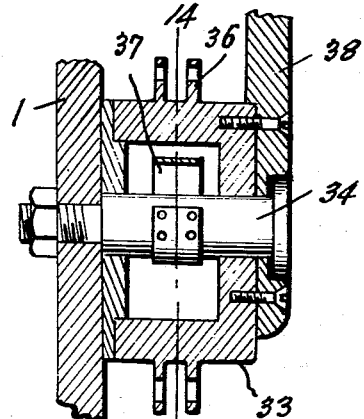
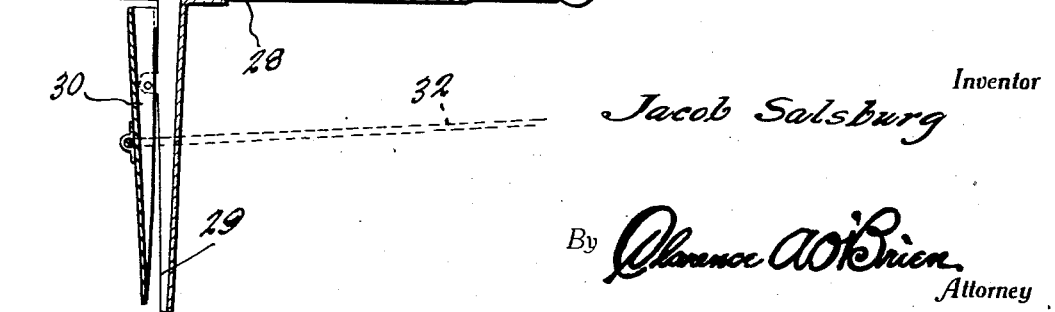

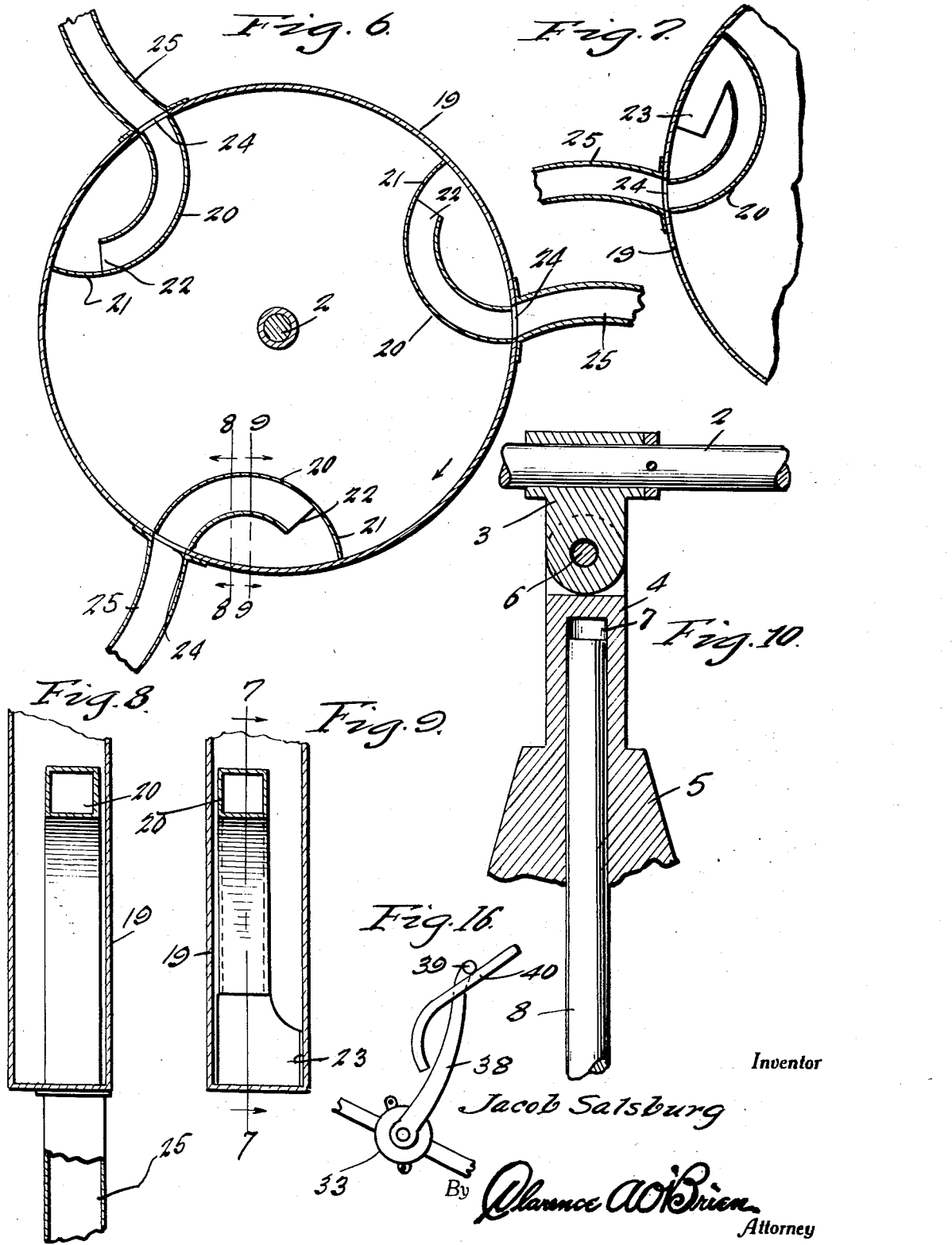

Patented July 25, 1933

1,919,397

UNITED STATES PATENT OFFICE

JACOB SALSBURG, OF WILKES-BARRE, PENNSYLVANIA

CORN PLANTER

Application filed January 11, 1933. Serial No. 651,208.

This invention relates to a planter which is mainly designed for planting corn but which can also be used for other seeds, if desired, the general object of the invention being to provide means for planting the seeds in hills arranged in transverse and longitudinal rows, whereby the plants may be cultivated in two directions, arranged at right angles to each other.

So that I can begin planting each row beginning with the boundary of the field, I provide my planter with a floating shaft which may be raised at the end of the row by a lever that operates a cam. When the end of the row is reached the planting hoppers are raised free of the tripping dogs so that the planter may be turned around without depositing any seed. Then by turning the hand wheel the tripping mechanism can be made to deposit seed on the boundary line of the field. Since the depositing mechanism will deposit seed uniformly when once set in operation, then the balance of the row begun will coincide with the previous row, when each row is begun on the same line.

Another feature of the invention is the manner in which one planting wheel may be rendered inoperative by rocking the axis of the shaft. This will enable the planter to be used where one boundary line of the field is on an angle with respect to the row being planted. When the outside wheel reaches the boundary line it is raised into inoperative position, while the other wheel continues planting the inside row.

Another feature of the invention resides in the novel hopper construction which has the arcuate tube for intermittently feeding a supply of seed to the dispensing mechanism at a predetermined time.

To maintain a uniform width between the rows, a conventional marker is attached to the planter so that the wheel of the planter may be guided along the line made by the marker on the return trip.

The uniform distance between each hill of corn is 39 inches, and there should be a space of 39 inches between the rows. This is the distance the inventor has found to be advantageous in the soil that he has cultivated for corn.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view through the invention.

Fig. 2 is a section on line 2—2 of Fig. 1.

Fig. 3 is a section on line 3—3 of Fig. 1.

Fig. 4 is a sectional view through portions of the hopper, the feed controlling means and the dibble.

Fig. 5 is a similar view with parts in a different position.

Fig. 6 is a circumferential view through the seed hopper and the spouts attached thereto.

Fig. 7 is a section on line 7—7 of Fig. 9.

Fig. 8 is a section on line 8—8 of Fig. 6.

Fig. 9 is a section on line 9—9 of Fig. 6.

Fig. 10 is an enlarged sectional detail view showing the manner of attaching the upper cam seed wheel carrying shaft.

Fig. 11 is a view of the cam in closed position.

Fig. 12 is a view showing the cam in open position.

Fig. 13 is a sectional detail view through the spring controlled wheel forming part of the tripping means.

Fig. 14 is a section on line 14—14 of Fig. 13.

Fig. 15 is a sectional view through the fertilizer dropping means.

Fig. 16 is a detail view showing how the trip arm engages the tripping cam.

In these views, the letter A indicates the frame of the planter which is supported on the axle $a$ to which the ground wheels $b$ are connected. A tongue $c$ is attached to the frame and is also a seat $d$.

In carrying out my invention I provide a pair of large seed wheels 1, these wheels being located outwardly of the ground wheels and have their hubs attached to a shaft 2 which carries a pair of collars 3, provided with depending portions to each of which the stem 4 of a top cam 5 is pivoted as shown at 6.

Each of these cams 5 is formed with a socket 7 in which fits a vertically arranged rod 8 so that the cam 5 has vertical sliding movement on the rod. These rods 8 have their lower ends fastened in the base members 9 attached to the main frame A adjacent the sides thereof. A lower cam 10 is supported on each rod 8 for rotary motion by a collar 11 fastened to the rod. A lever 12 is fastened to each cam 10 so that by rotating the cams 10 by the levers 12 the upper cams 5 can be raised and lowered so as to raise and lower the shaft 2 which of course results in the vertical movement of the wheels 1. By simply rotating one of the cams 10, one end of the shaft 2 is raised with a wheel 1 while the other end of the shaft and the corresponding wheel remains in lowered position.

Upwardly arranged projections 13 are formed on the upper ends of the lower cams 10 and recesses 14 formed in the corresponding parts of the upper cams for receiving these projections, so that these projections and recesses tend to hold the upper cams in either raised position or lowered position as shown in Figs. 11 and 12.

A pair of gears 15 is attached to the shaft 2, one adjacent each end thereof, and these gears, when the shaft 2 is in lowered position, will mesh with the idle gears 16, suitably supported from the frame, and which in turn mesh with the gears 17 attached to the hubs of the ground wheels $b$. Thus when the shaft 2 is in lowered position, it will be driven from the ground wheels and of course the seeding wheels 1 will also be rotated. When the shaft is raised, the gears will be out of mesh so that said shaft will not be rotated but if one end is raised while the other is lowered the shaft of course will be rotated though only one seed wheel will be in operative position. When in raised position the shaft 2 can be rotated by hand through means of the hand wheel 18 attached thereto at the center thereof so located that it can be turned by an operator occupying the seat $d$.

Each wheel 1 is formed with a circular casing 19 which is centrally arranged as shown and forms a seed hopper. Within each hopper or casing is arranged a number of semi-circular tubular members 20, each of which has one wall extended to the circumference of the casing as shown at 21 with the other wall shorter so that the inlet 22 of each tubular member is spaced from the circumference of the casing and one side wall is slightly offset and extended into the space formed by each tubular member, as shown at 23 in Figs. 7 and 9 so as to direct the seed located in the space formed by the tubular member 20 into the inlet 22 as the tubular member moves from the lower position shown in Fig. 6 to the left hand position shown in said figure.

The other end of each tubular member 20 is in communication with an opening 24 in the periphery of the casing 19 and a chute 25 leads from this opening 24 to an elongated flat casing 26 supported by the spokes of each wheel 1. Of course one of these casings 26 is associated with each chute 25 and its corresponding tubular member 20. A slide 27 slides in each casing 26 and has a hole 28 therein which in one position of the slide 27 will receive the seed from the spout 25 and in another position of the slide will deposit the seed collected in the hole 28 into the dibble 29 the upper end of which is connected with the casing 26. Each dibble 29 is formed with a stationary section and a pivoted section 30. This section 30 fitting against the section 29 at the lower part of the dibble to hold the seeds in the dibble when in one position of the member 30 as shown in Fig. 5 and in another position swings outwardly from the stationary section, as shown in Fig. 4, so that the seeds can drop from the dibble. Ears 31 at the upper end of the section 30 engage upper portions of the stationary section to limit the opening movement of the dibble as shown in Fig. 4.

A link 32 connects the section 30 with a drum 33 pivotally connected to a spoke of the wheel 1 by the bolt 34, as shown in Fig. 13 and a second link 35 connects the slide 27 with the opposite side of the drum as shown in Fig. 3. The drum is formed with the two pairs of ears 36 to which the ends of the links 32 and 35 are pivoted. A spring 37 has one end attached to an interior part of the drum 33 as shown in Fig. 14. This spring tends to hold the slide 26 in the position shown in Fig. 4 with the hole 28 in communication with the chute 25 and the movable section 30 of the dibble 29 in open position as also shown in Fig. 4. The trip arm 38 is rotatably arranged on the bolt 34 and is fastened to the drum 33 and has its free end bent as shown at 39.

As the arm moves downwardly it will engage the arcuate-shaped cam 40 carried by the brackets 41 attached to a part of the frame and as the bent part 39 rides over the convex part of cam 40 the arm is caused to move downwardly, as shown in Fig. 16, which partly rotates the drum so that the links 32 and 35 move the slide 27 and the movable section 30 of the dibble to the position they occupy in Fig. 5.

Thus it will be seen that as one of the tubular members 20 reaches the bottom position shown in Fig. 6, some of the seed in the casing 19 will fall into the space formed by said tubular part 20 and then as it moves upwardly to the left hand position shown in Fig. 6, some of the seeds will enter the tubular member and then as it moves and reaches the right hand position shown in Fig. 6, the seeds will pass thru the tubular member into the chute 25 and as the parts reach the position in Fig. 4, the seed in the chute 25 will drop into the hole 28. Then as the arm 38 of the drum 33 engages the cam 40 the drum will be partly rotated so as to move the slide 27 in the position it occupies in Fig. 5, so that the seeds in said hole 28 will drop into the dibble but cannot enter the ground as the dibble is closed. However as soon as this arm 38 passes beyond the cam 40, the spring 37 in the drum 33 will swing the section 30 of the dibble to open position and thus the seed held in the dibble will enter the ground while the slide 27 returns to the position it occupies in Fig. 4, to receive more seed from the chute 25. By providing slides 27 with different sizes of holes 28, the number of seeds dropped at each operation can be regulated. As shown the dibble slightly projects from the rim of the wheel 1 so that it will enter the ground slightly and thus the seed will drop into the ground. By spacing the dibbles and their associated parts proper distances apart on each wheel the spaces between the hills can be made any desired number of inches apart.

Each wheel has a number of blocks 42, each of which is placed midway between a pair of dibbles as shown in Fig. 3. These blocks 42 will make marks in the field as the planter travels along so that at the end of the field the operator can turn the implement to start back across the field after he has raised shaft 2 and after he has turned around he can rotate the wheels 1 by turning the shaft 2 by means of the hand wheel 18 to place a block 42 opposite the mark in the planted row made by one of the blocks 42 so as to start the next two rows in the proper place where the hills will be in alinement with the planted hills. If the field is not straight at one edge, and it is desired to continue one row beyond the other row to be planted, the operator can raise one end of the shaft 2 so that the lowered end and its wheel will continue to plant and the raised wheel will not plant as the arms 38 of said other wheel will not engage the trip cam 40.

I may also place a pair of fertilizer hoppers 43 on the implement, the discharge of each of which is controlled by a slide 44 somewhat similar to the slide 27 and this slide 44 is normally held in the position shown in Fig. 15 by a spring 45 so that some of the fertilizer will enter the hole 46 in the slide. By moving the slide 44 outwardly, fertilizer contained in the hole 46 will drop into the spout 47 which deposits it in the planted row and said slide is operated by the projections 48 on a casing 19 by means of a shaft 49 journalled in a bracket 50 and having one end connected with the slide and its other end bent as at 51 to be engaged by the projections 48 during the rotation of the wheel 1. These parts are also so arranged that when a wheel is raised the projections 48 will not contact the bent end 51 of the shaft 49 and thus no fertilizer will be released from the hopper.

A pair of covering plows 52 is provided for covering the seeds dropped by each seed wheel and these plows are attached to the beams 53 pivoted at their forward ends to the hangers 54. Each beam 53 is connected by a cable 55 to an arm 56 attached to the lower cam 10 so that as this cam is moved to raise an end of the shaft 2 the beam is pulled upwardly so that the covered plows are raised into inoperative position. Of course the wheel which remains in lowered position has its plows in operative position so that they will still cover the seeds.

Each casing has an opening, closed by a door 57 so that the seeds can be placed in the casing. Thus it will be seen that I have provided means for dropping a number of seeds in each hill with the hills arranged certain distances apart in each row and the hills of one row being in alinement with the hills of the other rows, with means for raising both wheels when desired, which renders the dropping means, the covering means and the fertilizer dropping means inoperative, and means for raising one wheel while permitting the other wheel to remain in operative position. The use of the dibbles insures the placing of the seeds in the ground and the arrangement of the dibbles is such that there is little danger of their being damaged as they only enter the ground a short distance and are so placed on the wheel that little if any strain by the dirt is encountered by them. After the seeds are dropped they are lightly covered by the pair of plows 52 associated with each wheel 1.

I also provide the usual extensible marker, shown generally at 58 for making a mark in the ground to indicate where the next row is to be planted.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A planter of the class described comprising a wheel supported frame, a shaft supported for vertical movement by the frame, a planter wheel at each end of the shaft, a hopper carried by each wheel, delivery means carried by each wheel for delivering seed from the hopper to the ground, means for controlling the passage of seeds to the delivery means, manually operated means for raising and lowering the shaft to raise and lower the seed wheels, means for rotating the shaft when the same is in lowered position, and means whereby the passage of seeds through the delivery means is stopped when the shaft is in raised position.

2. A planter of the class described comprising a wheel supported frame, a shaft supported for vertical movement therein, a seed wheel at each end of the shaft, means adjacent each end of the shaft for rotating the shaft from the ground wheels when the shaft is in lowered position, means for raising the shaft bodily to render both seed wheels inoperative or to raise but one end of the shaft to render one seed wheel inoperative and the other seed wheel operative, and means carried by each seed wheel for planting seeds in spaced hills.

3. A planter of the class described comprising a frame, wheels supporting the same, a shaft, means adjacent each end of the shaft for raising and lowering said end of the shaft, said shaft being raised bodily when both of the aforementioned means are actuated, gears for rotating the shaft from the ground wheels when the shaft is in lowered position or one end is in lowered position, a seed wheel attached to each end of the shaft, a hopper carried by each wheel, a number of dibbles carried by each wheel, conduits connecting the dibbles with the hopper, means for controlling the passage of the seeds through the conduits, each dibble having a movable section, trip means for operating the seed controlling means and for opening and closing the dibbles, the trip means being rendered inoperative when a seed wheel is in raised position.

4. A planter of the class described comprising a frame, wheels supporting the same, a shaft, means adjacent each end of the shaft for raising and lowering said end of the shaft, said shaft being raised bodily when both of the aforementioned means are actuated, gears for rotating the shaft from the ground wheels when the shaft is in lowered position or one end is in lowered position, a seed wheel attached to each end of the shaft, a hopper carried by each wheel, a number of dibbles carried by each wheel, conduits connecting the dibbles with the hopper, means for controlling the passage of the seeds through the conduits, each dibble having a movable section, trip means for operating the seed controlling means and for opening and closing the dibbles, the trip means being rendered inoperative when a seed wheel is in raised position, covering means located in rear of each seed wheel and means for rendering the covering means inoperative when a seed wheel is in raised position.

5. A planter of the class described comprising a frame, wheels supporting the same, a shaft, means adjacent each end of the shaft for raising and lowering said end of the shaft, said shaft being raised bodily when both of the aforementioned means are actuated, gears for rotating the shaft from the ground wheels when the shaft is in lowered position or one end is in lowered position, a seed wheel attached to each end of the shaft, a hopper carried by each wheel, a number of dibbles carried by each wheel, conduits connecting the dibbles with the hopper, means for controlling the passage of the seeds through the conduits, each dibble having a movable section, trip means for operating the seed controlling means and for opening and closing the dibbles, the trip means being rendered inoperative when a seed wheel is in raised position, covering means located in rear of each seed wheel, means for rendering the covering means inoperative when a seed wheel is in raised position, a fertilizer hopper for each wheel, a spout delivering the fertilizer from the hopper to the ground, and means for controlling the flow of fertilizer through the spout operated by the rotation of a seed wheel, said controlling means being inoperative when the seed wheel is in raised position.

6. In a planter, a seed wheel, a hopper carried thereby, a number of substantially semi-circular tubular members in the hopper, each having one end in communication with the hopper to receive seeds therefrom and the periphery of the hopper having an opening therein in communication with the other end of the tubular member, spouts carried by the hopper, each in communication with an opening, a slide having an opening therein for receiving seeds from each spout, a casing for said slide, a dibble connected to each of said last-mentioned casings and comprising a stationary part and a pivoted part, a spring actuated drum for each slide and dibble, links connecting the drum with the slide and dibble, the spring of said drum normally holding the same in position with the side receiving seeds from its spout and the movable section of the dibble in open position, a trip arm connected with each drum, a cam member for moving the arm to cause the drum to move the slide into a position to deposit the seeds in the hole therein into the dibble and to close the movable section of the dibble, the spring of the drum returning the slide to its first position and opening the movable section of the dibble when the arm passes the cam, said dibbles projecting slightly from the rim of the wheel.

7. In a seed planter, a frame, wheels supporting the same, a shaft, seeding wheels attached to the ends thereof, a pair of cam members to which the shaft is pivotally connected, a second pair of cam members engaging the first pair, said cam members being arranged adjacent the ends of the shaft, means for rotating the second pair of cam members to raise and lower the first pair to raise and lower the shaft, such means permitting rotary movement of one cam member of the lower pair without rotating the other one of the pair, gearing connecting the shaft with the ground wheels and arranged adjacent the ends of the shaft whereby one end of the shaft with its seed wheel can be raised while the other remains lowered, and seed means carried by each seed wheel.

JACOB SALSBURG.